United States Patent
Aleshin et al.

(10) Patent No.: US 12,080,438 B2
(45) Date of Patent: Sep. 3, 2024

(54) DEVICES, SYSTEMS, AND METHODS FOR ADJUSTING THE OUTPUT OF A REACTOR CORE

(71) Applicant: Westinghouse Electric Company LLC, Cranberry Township, PA (US)

(72) Inventors: Yuriy Aleshin, Cayce, SC (US); Alex Levinsky, Pittsburgh, PA (US)

(73) Assignee: Westinghouse Electric Company LLC, Cranberry Township, PA (US)

(*) Notice: Subject to any disclaimer, the term of this patent is extended or adjusted under 35 U.S.C. 154(b) by 0 days.

(21) Appl. No.: 17/084,365

(22) Filed: Oct. 29, 2020

(65) Prior Publication Data
US 2022/0139579 A1    May 5, 2022

(51) Int. Cl.
G21C 15/257    (2006.01)
G21C 7/103     (2006.01)
G21C 7/36      (2006.01)

(52) U.S. Cl.
CPC .............. *G21C 7/103* (2013.01); *G21C 7/36* (2013.01); *G21C 15/257* (2013.01)

(58) Field of Classification Search
CPC .............................. G21C 15/257; F28D 15/02
See application file for complete search history.

(56) References Cited

U.S. PATENT DOCUMENTS

| | | | |
|---|---|---|---|
| 9,330,798 B2 | 5/2016 | Dayal et al. | |
| 2013/0156143 A1 | 6/2013 | Bingham | |
| 2016/0329113 A1 | 11/2016 | El-Genk | |
| 2018/0033501 A1 | 2/2018 | Kimura et al. | |
| 2018/0226159 A1* | 8/2018 | Sterbentz | G21C 3/626 |
| 2018/0268950 A1* | 9/2018 | McKellar | G21D 1/006 |
| 2020/0373027 A1* | 11/2020 | Gramlich | G21C 13/02 |

(Continued)

FOREIGN PATENT DOCUMENTS

| | | | |
|---|---|---|---|
| CN | 111968764 A | * | 11/2020 |
| JP | 2015072223 A | * | 4/2015 |

(Continued)

OTHER PUBLICATIONS

Search Report for corresponding Taiwan Patent Application No. 110140316, dated Jun. 21, 2022.

(Continued)

*Primary Examiner* — Lily C Garner
(74) *Attorney, Agent, or Firm* — K&L Gates LLP

(57) ABSTRACT

An adjustable core assembly for a nuclear reactor is disclosed herein. The adjustable core can include a plurality of reactivity control cells configured to accommodate a reactivity control rod, and a plurality of unit cells. The plurality of unit cells defines a radial dimension corresponding to an initial power output of the core. Each unit cell of the plurality of unit cells is configured to accommodate fuel configured to generate energy and a heat pipe configured to transfer thermal energy away from the core. Each unit cell of the plurality unit cells can be coupled to an adjacent unit cell in a radial direction, thereby altering the radial dimension, wherein the altered radial dimension corresponds to an adjusted power output of the core, and wherein the adjusted power output of the core is different than the initial power output of the core.

5 Claims, 8 Drawing Sheets

(56) References Cited

U.S. PATENT DOCUMENTS

2023/0107838 A1* 4/2023 Dasari .................. G21C 1/16
376/347

FOREIGN PATENT DOCUMENTS

| TW | 201330004 A | 7/2013 |
|---|---|---|
| WO | 2015145820 A1 | 10/2015 |

OTHER PUBLICATIONS

International Search Report and Written Opinion for International PCT Application No. PCT/US2021/072107, dated Feb. 23, 2022.
Sun et al., Conceptual design and analysis of a multipurpose micro nuclear reactor power source, Annals of Nuclear Energy (Jul. 18, 2018), 121:118-127.
Zhang et al., Conceptual design and analysis of a megawatt power level heat pipe cooled space reactor power system, Annals of Nuclear Energy (May 11, 2020), 144:1-18.
International Preliminary Examination on Patentability for PCT Application No. PCT/US2021/072107 mailed on May 2, 2023.

* cited by examiner

Core Model (with BeO Reflector)

017.037 | 905.491 | 993.144 | 1000.0 | 1160.46
063.664 | 949.317 | 1036.97 | 1224.62 | 1212.20

Temperature (with BeO Reflector)

111565.7 | .377E+07 | .739E-07 | .212E-08 | .130E-08
.292E-07 | .561E-07 | .906E-07 | .131E-08 | .165E-08

Graphite Block (w/o Reflector)

DEVICES, SYSTEMS, AND METHODS FOR ADJUSTING THE OUTPUT OF A REACTOR CORE

GOVERNMENT CONTRACTS

This invention was made with government support under Contract DE-NE0008853 awarded by the Department of Energy. The government has certain rights in the invention.

FIELD

The present disclosure is generally related to nuclear power generation and, more particularly, is directed to an improved device configured to adjust the output of a nuclear core.

SUMMARY

The following summary is provided to facilitate an understanding of some of the innovative features unique to the aspects disclosed herein, and is not intended to be a full description. A full appreciation of the various aspects can be gained by taking the entire specification, claims, and abstract as a whole.

In various aspects, an adjustable core for a nuclear reactor is disclosed. The adjustable core can include a plurality of reactivity control cells, wherein each reactivity control cell of the plurality of reactivity control cells includes a reactivity control rod interface configured to accommodate a reactivity control rod including a neutron absorptive material, and a plurality of unit cells, wherein each unit cell of the plurality of unit cells includes a plurality of fuel channels configured to accommodate fuel, and wherein each cell of the plurality of unit cells includes a plurality of heat pipe channels configured to accommodate a heat pipe configured to transfer thermal energy away from the core, wherein each unit cell of the plurality unit cells is configured to be arranged adjacent to another unit cell of the plurality of unit cells in a radial direction, thereby defining a radial dimension of the adjustable core, wherein the radial dimension corresponds to a predetermined power output of the adjustable core.

In various aspects, an adjustable core assembly for a nuclear reactor is disclosed. The adjustable core assembly can include a plurality of reactivity control cells, wherein each reactivity control cell of the plurality of reactivity control cells is configured to accommodate a reactivity control rod including a neutron absorptive material, and a plurality of unit cells, wherein the plurality of unit cells defines a radial dimension corresponding to an initial power output of the core, wherein each unit cell of the plurality of unit cells is configured to accommodate fuel configured to generate energy, and wherein each unit cell of the plurality of unit cells is configured to accommodate a heat pipe configured to transfer thermal energy away from the core, wherein each unit cell of the plurality unit cells is modularly configured to be coupled to an adjacent unit cell of the plurality of unit cells in a radial direction, thereby altering the radial dimension, wherein the altered radial dimension corresponds to an adjusted power output of the core, and wherein the adjusted power output of the core is different than the initial power output of the core.

In various aspects, a method of adjusting the power output of a core of a nuclear reactor, wherein the core includes a plurality of unit cells, wherein each unit cell of the plurality of unit cells is configured to accommodate fuel configured to generate energy, wherein each unit cell of the plurality of unit cells is configured to accommodate a heat pipe configured to transfer thermal energy away from the core, wherein an initial number of unit cells in the plurality of unit cells corresponds to an initial power output of the core, the method including determining an amount of fuel based, at least in part, on a desired power output of the core, wherein the desired power output of the core corresponds to an intended application of the nuclear reactor, determining a number of heat pipes based, at least in part, on a predetermined requirement of the core, wherein the predetermined requirement of the core is based, at least in part, on the intended application of the nuclear reactor, determining a number of unit cells based, at least in part, on the amount of fuel corresponding to the desired power output and the determined number of heat pipes corresponding to the predetermined requirement, and mechanically altering the plurality of unit cells such that the initial number of unit cells becomes the determined number of unit cells, thereby altering the core such that the initial power output of the core becomes the desired power output of the core.

These and other objects, features, and characteristics of the present invention, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention.

BRIEF DESCRIPTION OF THE DRAWINGS

Various features of the aspects described herein are set forth with particularity in the appended claims. The various aspects, however, both as to organization and methods of operation, together with advantages thereof, may be understood in accordance with the following description taken in conjunction with the accompanying drawings as follows:

Corresponding reference characters indicate corresponding parts throughout the several views. The exemplifications set out herein illustrate various aspects of the invention, in one form, and such exemplifications are not to be construed as limiting the scope of the invention in any manner.

DETAILED DESCRIPTION

Figure 1:
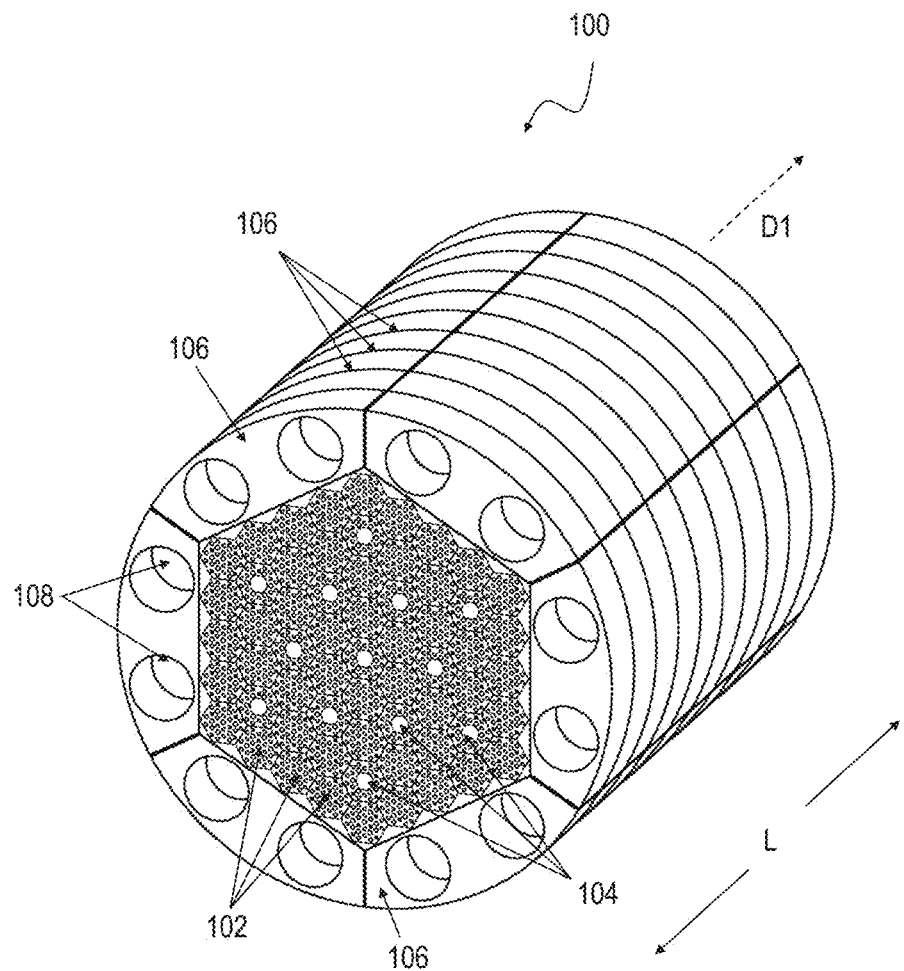
FIG. 1 illustrates a perspective view of a core design that can be modified to adjust the output of a nuclear reactor, in accordance with at least one non-limiting aspect of the present disclosure.

Numerous specific details are set forth to provide a thorough understanding of the overall structure, function, manufacture, and use of the aspects as described in the disclosure and illustrated in the accompanying drawings. Well-known operations, components, and elements have not been described in detail so as not to obscure the aspects described in the specification. The reader will understand that the aspects described and illustrated herein are non-limiting examples, and thus it can be appreciated that the specific structural and functional details disclosed herein may be representative and illustrative. Variations and changes thereto may be made without departing from the scope of the claims. Furthermore, it is to be understood that such terms as "forward", "rearward", "left", "right", "upwardly", "downwardly", and the like are words of convenience and are not to be construed as limiting terms. Furthermore, it is to be understood that such terms as "forward", "rearward", "left", "right", "upwardly", "downwardly", and the like are words of convenience and are not to be construed as limiting terms.

In the following description, like reference characters designate like or corresponding parts throughout the several views of the drawings. Also in the following description, it is to be understood that such terms as "forward", "rearward", "left", "right", "upwardly", "downwardly", and the like are words of convenience and are not to be construed as limiting terms.

Before explaining various aspects of the articulated manipulator in detail, it should be noted that the illustrative examples are not limited in application or use to the details of construction and arrangement of parts illustrated in the accompanying drawings and description. The illustrative examples may be implemented or incorporated in other aspects, variations, and modifications, and may be practiced or carried out in various ways. Further, unless otherwise indicated, the terms and expressions employed herein have been chosen for the purpose of describing the illustrative examples for the convenience of the reader and are not for the purpose of limitation thereof. Also, it will be appreciated that one or more of the following-described aspects, expressions of aspects, and/or examples, can be combined with any one or more of the other following-described aspects, expressions of aspects, and/or examples.

The present disclosure is directed to devices, systems, and methods to adjust the output of a reactor core. Nuclear reactors are typically manufactured to produce a specific power output for the intended application. Aside from application specific power requirements, the design and production of a nuclear reactor must also comply with a wide variety of internal and/or governmental safety regulations. For example, nuclear reactors must be designed and manufactured in compliance with a number of different criteria, such as: (i) the ability to accommodate a number of different fuels and/or moderators (e.g. graphite, Beryllium Oxide, Yttrium Hydride, Zirconium Hydride); (ii) the ability to be thermo-mechanically self-sufficient during a normal operation and a postulated failure; (iii) the ability to support available manufacturing capabilities; (iv) the ability to integrate with existing core components (e.g. radial reflector); and (v) the ability to be scalable for use with both transportable and mobile reactors. Conventional nuclear reactors were large, which limited their number of applications. However, both size constraints and limited applications made it is easier for manufacturers to converge on a small number of conventional designs that could be commercialized in compliance with the applicable requirements and/or regulations.

As nuclear reactors continue to decrease in size they also increase in versatility. New nuclear reactors, including micro-reactors, can be effectively implemented in a growing number of emerging and unprecedented applications. However, the reliability of a nuclear reactor's design and performance—as well as its compliance with applicable requirements and/or regulations—is more important than ever. For example, as nuclear reactors become more versatile, they become more prevalent and thus, the effects of a reactor failure can be greater and farther reaching. No single reactor design is suitable for the expanded number of applications. Yet, it can be commercially impractical and potentially unsafe to create a new design for each new application. For example, infinite development of new reactor designs can implicate increased costs and risks associated with production and operation. In other words "one size" nuclear reactor does not fit all. Accordingly, there is a need for improved devices, systems, and methods to adjust the output of a reactor core design, while retaining compliance with applicable requirements and/or regulations. Such devices, systems, and methods would enable the reactor to be easily modified for each new application, while preserving the stability of the reactor's manufacture and operation.

Referring now to FIG. 1, a perspective view of a core 100 that can be modified to adjust the output of a nuclear reactor is depicted in accordance with at least one non-limiting aspect of the present disclosure. According to the non-limiting aspect of FIG. 1, the core 100 includes a plurality of unit cells 102, which collectively form a hexagonal core boundaries. Each unit cell 102 can be configured to accommodate a heat pipe and an amount of fuel (e.g. in the form of a rod and/or stack configuration), which can collectively generate nuclear power and manage thermal energy throughout the core 100. According to some non-limiting aspects, one or more unit cells 102 can further include a moderator configuration, which can slow down neutrons emitted from the fuel. As depicted in the non-limiting aspect of FIG. 1, the unit cells 102 can be arranged such that the core 100 includes a hexagonal geometry. However, in other non-limiting aspects, the unit cells 102 can be arranged such that the core 100 includes any of a number of different geometrical configurations, depending on intended application and/or user preference.

In further reference to FIG. 1, the core 100 can further include a plurality of reactivity control cells 104. Each cell 104 can be configured to accommodate a reactivity control rod configuration, which can collectively work to control the fission occurring within the core 100 and therefore, prevent the core 100 from achieving a critical temperature in the event of a reactor and/or power failure or criticality accident. According to various non-limiting aspects, the amount of fission can be reduced or completely eliminated within the core 100, the latter of which can shut the core down. The reactivity control rods contemplated by the present disclosure can include a neutron absorbing material and be configured to be inserted into the reactivity control cells 104 to slow and/or stop the nuclear reactions in the case of an emergency. The reactivity control configuration of the core 100 of FIG. 1 represents a valuable feature of the modern micro-reactors, which are transportable and have a broader range of commercial applications. Accordingly, the emergence of micro-reactor can increase the prevalence of nuclear technology, making safety a higher priority.

According to the non-limiting aspect of FIG. 1, the core 100 can further include a reflector 106. For example, the reflector 106 can include one or more plates composed of a thick, neutron moderating material (e.g. Beryllium Oxide, graphite, and/or combinations thereof) and configured to substantially surround the core 100. The reflector 106 can further include a plurality of control drums 108 configured to house a neutron absorptive material. In the event of a reactor and/or power failure, the control drums 108 can turn inward towards the core 100 such that the absorptive material to shut down the reactor. According to some non-limiting aspects, the reflector 106 can additionally include a gamma shield configured to provide gamma and neutron shielding. As depicted in the non-limiting aspect of FIG. 1, the reflector 106 can be arranged in a circular configuration that surrounds the hexagonally arranged plurality of unit cells 102. However, in other non-limiting aspects, the reflector 106 can be arranged to form any of a number of different geometrical configurations about the plurality of unit cells 102, depending on intended application and/or user preference.

Still referring to FIG. 1, the reflector 106 can be sectioned to ensure that a gap exists between the unit cells 102 and the reflector 106 as a means of controlling and promoting a desired amount of heat transfer. For example, the reflector 106 can be formed from a plurality of modular plates integrated to create the aforementioned gap. However in other non-limiting aspects, the reflector 106 can be integrally formed. Additionally, the reflector 106 can be further configured to extend along an axial direction D1, which defines a length L of the core 100. The plurality of unit cells 102 can also be configured to span the length L of the core 100.

Some compact reactors function as a "nuclear battery" which uses energy from the fission of nuclear materials (e.g. uranium in an oxide, metallic and/or silicide form, amongst others) to generate electricity. Since the unit cells are configured to accommodate fuel, in any form, including such radioactive isotopes, the magnitude of the length L of the core 100 can correspond to a desired output of the nuclear reactor and the fuel mass necessary to maintain criticality. Additionally and/or alternatively, the increased versatility of micro-reactors mean the core 100 must be configurable for a wide variety of applications, many of which might have size and/or weight constraints. Therefore, the design of core 100 allows for the length L to be specifically configurable to accommodate for the output, size, and/or weight requirements of the nuclear reactor.

Figure 2:
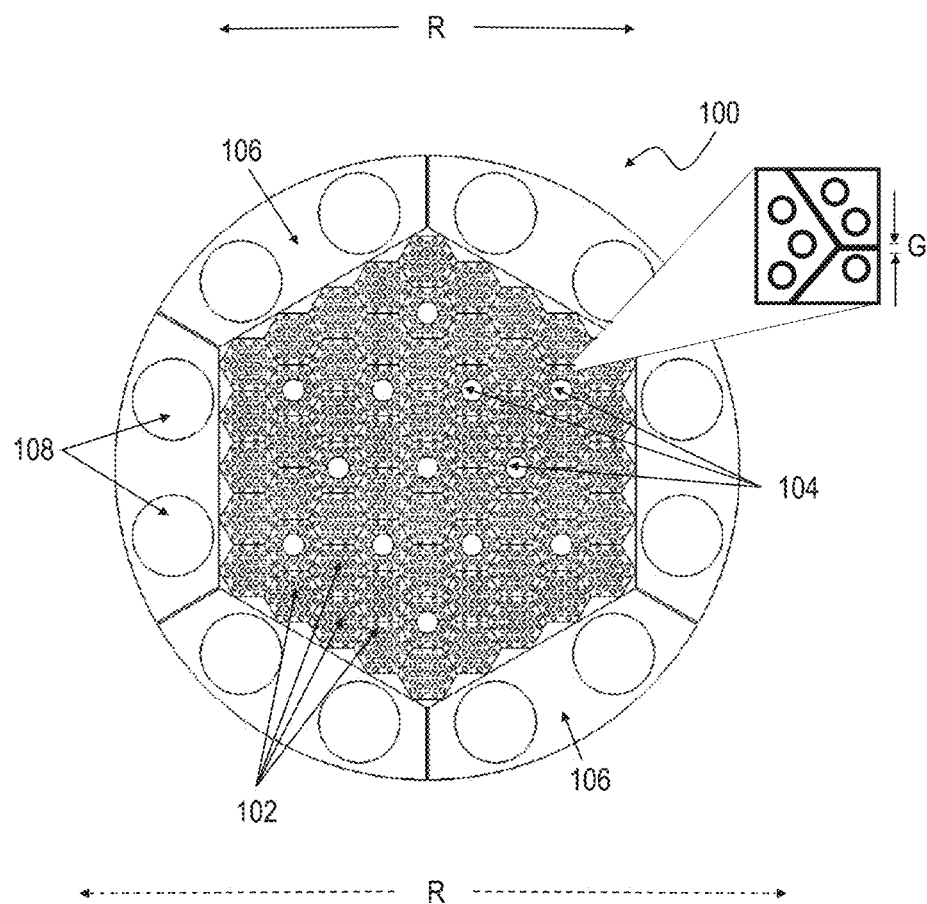
FIG. 2 illustrates a top view of the adjustable core design of FIG. 1, in accordance with at least one non-limiting aspect of the present disclosure.

Referring now to FIG. 2, a top view of the core design of FIG. 1 is depicted in accordance with at least one non-limiting aspect of the present disclosure. FIG. 2 illustrates how the plurality of unit cells 102 and the plurality of reactivity control cells 104 can be particularly arranged to establish the hexagonal configuration of the non-limiting aspect of the core 100. It is also evident that each unit cell 102 of the plurality of unit cells 102 and each reactivity control cell 104 of the plurality of reactivity control cells 104 include a hexagonal configuration as well. However, it shall be appreciated that the hexagonal configuration is exclusively depicted for illustrative purposes. Accordingly, the present disclosure contemplates other non-limiting aspects in which the unit cells 102 include any number of geometrical configurations (e.g. square, circular, triangular, rectangular, pentagonal, octagonal) and arranged such that the core 100 can include any number of geometrical configurations.

In further reference of FIG. 2, the plurality of unit cells 102 and the plurality of reactivity control cells 104 can be arranged along a radial direction D2, thereby defining a radial dimension R of the core 100. Specifically, the non-limiting aspect of FIG. 2 depicts a core 100 with 61 unit cells 102. However, the present disclosure contemplates other non-limiting aspects wherein the core 102 includes any number of unit cells 102. In fact, the ability to easily add or subtract the number of unit cells 102 to the core 100 without dramatically altering its design allow the core 100 to be easily scaled depending on the intended application and/or user preference. As such, the output of the core 100 design can also be easily adjusted for a multitude of applications and requirements. For example, a user can change the radial and/or axial dimension of the core 100 by adding or subtracting unit cells 102 to the core 100. Since the unit cells are configured to accommodate fuel including radioactive isotopes, increasing or decreasing the magnitude of the radial dimension R can alter the output of the core 100. Accordingly, the radial dimension R of the core 100 can correspond to a desired output of the nuclear reactor depending on the intended application and/or user preference. Additionally and/or alternatively, the radial dimension R of the core 100 can be specifically configured to comply with a multitude of size and/or weight requirements, which can vary by application.

It shall be appreciated that the term "radial", as used in the present disclosure, describes any direction extending from the center of the core 100 when viewed from the top. Accordingly, the use of the term "radial" shall not be limited to circular or circular-like configurations and shall not be construed to imply that the core 100 of FIGS. 1 and 2 is limited to circular, or circular-like, configurations. For example, the present disclosure contemplates non-limiting aspects in which the core 100 includes a rectangular configuration. According to such aspects, the core 100 can include one or more radial dimensions of varying lengths.

Still referring to FIG. 2, the plurality of unit cells 102 and the plurality of reactivity control cells 104 can be integrally formed from a solid block of material (e.g. graphite). Thus, the internal features of each of the unit cells 102, such as heat pipe channels, fuel channels, moderator channels, and/or the like, can be bored out of—and integrally formed from—the solid block of material. However, according to other non-limiting aspects, each unit cell 102 of the plurality of unit cells 102 and each reactivity control cell 104 of the plurality of reactivity control cells 104 can be modularly formed and integrated into the core block to promote the adjustability of the core design. Regardless, the core 100 can be easily manufactured to include any number of unit cells 102 and/or reactivity control cells 104. This can allow the core 100 design to be easily scalable, an obvious improvement over known reactors. For example, altering the number of unit cells 102 and reactivity control cells 104 allows the user to alter the radial dimension R and length L (FIG. 1) of the core 100, thereby altering its output and flexibility for applications with unique output and/or space constraints. However, the core 100 design essentially remains the same, which allows for predictability in production and performance regardless of the difference in output and size. These features also reduce the amount of non-recurring engineering required to design for a new application and facilitates manufacturing consistency and the standardization of parts. Although the core 100 of FIGS. 1 and 2 can be scaled as a means of adjusting its output, the scaling should further consider the power rating of the implemented heat pipes, the appropriate number of reactivity control rods required for the adjusted output, and the effectiveness of the control drums.

In further reference to FIG. 2, each of the cells 102 can be configured to be self-sufficient. As used in this disclosure, "self-sufficient" shall be construed as the ability of each unit cell 102 to independently dissipate heat generated by fuel oriented within the unit cell 102 via heat rods. However, as a safety measure, the unit cells 102 are specifically arranged such that the gap G between any two adjacent unit cells 102 is less than or equal to 2 millimeters. As such, in the event one or more heat pipes fail within any given unit cell 102, the adjacent unit cells 102 can be positioned close enough to unit cell 102 with the failed heat pipe such that it will transfer the excess heat away from the core 100. Thus, the unit cells 102 can be configured to ensure that the core 100 can operate at an acceptable temperature, even when a unit cell is no long self-sufficient due to heat pipe failure.

Additionally, the unit cells 102 of FIG. 2 can be geometrically configured and oriented relative to one another in a triangular pattern, which includes a predetermined pitch calculated to achieve a desired output. For example, the core 100 of FIG. 2 can include a pitch that is greater or equal to 150 millimeters and less than or equal to 200 millimeters. However, the present disclosure contemplates other non-limiting aspects including any number of different pitches based on any number of desired outputs, as required by the intended application and/or user preference. Hence, the plurality of unit cells 102 can include a variety of geometrical variables, which can be attenuated to further adjust the output of the core 100. In fact, it is the particular geometry and the relative locations of unit cells 102, as well as the configuration and geometry of the reflector 106, that can be carefully selected to adjust the output of the core 100 to satisfy the demand of a particular application while complying with additional requirements.

Figure 3:
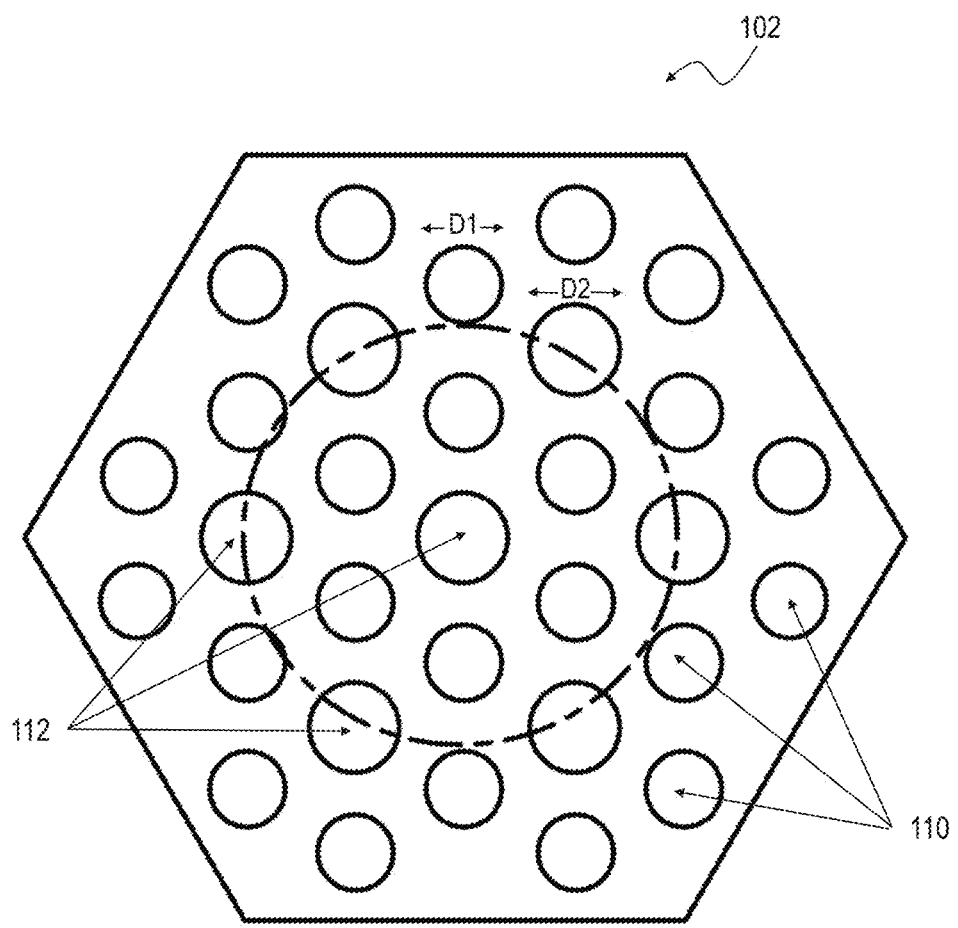
FIG. 3 illustrates a top view of a unit cell of the adjustable core design of FIGS. 1 and 2, in accordance with at least one non-limiting aspect of the present disclosure.

Referring now to FIG. 3, a top view of a unit cell 102 of the core 100 of FIGS. 1 and 2 is depicted in accordance with at least one non-limiting aspect of the present disclosure. According to the non-limiting aspect of FIG. 3, the unit cell 102 can include a plurality of fuel channels 110 configured to accommodate the fuel of the core 100 and a plurality of heat pipe channels 112 configured to accommodate a heat pipe of the core 100. Specifically, the unit cell 102 of FIG. 3 includes twenty-four fuel channels 110 and seven heat pipe channels 112. However, it shall be appreciated that the unit cell 102 can include any number of fuel channels 110 and heat pipe channels 112 to optimize the generation of nuclear energy and enhance the efficiency by which thermal energy is removed from the core 100. As previously discussed, each unit cell 102 is configured to be self-sufficient. Accordingly, each heat pipe channel 112 can be surrounded by several fuel channels 110 of the core, such that thermal energy generated by fuel inserted within the fuel channels 110 can be effectively transferred away from the core 100. For example, the fuel can include fissionable materials (e.g. Uranium Disilicide, Uranium Dioxide and Tri-structural Isotropic Particle Fuels with Uranium Nitride or Uranium Oxicarbide kernels).

According to other non-limiting aspects, the unit cell 102 of FIG. 3 can further include a moderator channel configured to accommodate a moderator (e.g. a hydride-based moderator, BeO, etc.) of the core 100, wherein the moderator can be configured to retard and the propagation of neutrons emitted by fuel inserted in the plurality of fuel channels 110. Alternatively and/or additionally, the unit cell 102 can include additional features, configured to accommodate other instrumentation of the core 100.

In further reference to FIG. 3, the plurality of fuel channels 110 can be configured to have a first diameter D1 and the plurality of heat pipe channels 112 can be configured to have a second diameter D2. According to some non-limiting embodiments, the first diameter D1 and the second diameter D2 are related to provide for a balance between heat generation and heat removal. This can assist the unit cell 102 in being self-sufficient, such that the heat pipes inserted into the heat pipe channels 112 have a greater conductive and/or convective surface area to improve their ability to transfer heat away from the core 100. Similar to the gaps G between unit cells 102, the first diameter D1 of the fuel channels 110 and the second diameter D2 of the heat pipe channels 112 can be configured such that a desired gap exists between a fuel stack and the internal walls of a fuel channel 110, as well as between a heat pipe and the internal walls of a heat pipe channel 112, when are properly inserted into the unit cell 102. Again, such gaps can be geometrically configured to optimize heat transfer throughout the unit cells 102 and throughout the core 100 as a whole. Although the non-limiting aspect of FIG. 3 includes channels 110, 112 with a circular configuration, it shall be appreciated that the present disclosure contemplates other non-limiting aspects wherein the channels 110, 112 with any number of geometric configurations to optimize heat transfer for the intended application and user preference. Accordingly, the term "diameter", as used by the present disclosure, shall include any dimension that extends away from a center point of the channel 110, 112. As such, it shall be appreciated that the term "diameter" is not intended to limit the channels 110, 112 to a circular configuration.

Still referring to FIG. 3, the unit cell 102 can also include features configured to accommodate a neutron absorbing materials that can slow the nuclear reactions occurring in the fuel channels 110 of the unit cells 102. Accordingly, the power distribution and radial power peaking of the unit cells 102—and consequentially, the core 100 itself—can be further adjusted via the influence of neutron absorbers. According to some non-limiting aspects, the core 100 can be designed for an application that does not impose a strict transportation requirement on the core 100. Alternatively and/or additionally, the core 100 can use a high-density fuel. According to such aspects, the axial power peaking factor and axial power distribution of the unit cells 102 and core 100 can be otherwise managed by varying the fuel enrichment level within the fuel channels 110 of the unit cells 102 or by adding burnable absorbers.

Figure 4A:
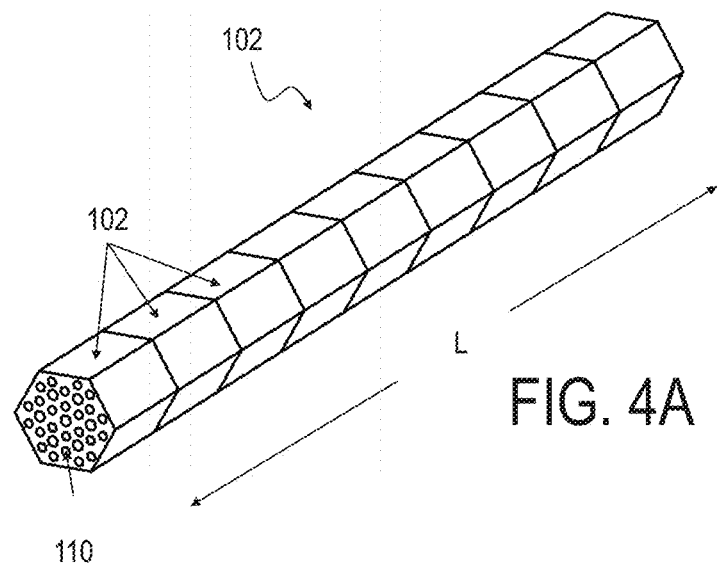
FIG. 4A illustrates a perspective view of the unit cell of FIG. 3, in accordance with at least one non-limiting aspect of the present disclosure.

Referring now to FIG. 4A, a perspective view of the unit cell of FIG. 3 is depicted in accordance with at least one non-limiting aspect of the present disclosure. According to the non-limiting aspect of FIG. 4A, a plurality of unit cells 102 are configured to extend along at least a portion of the length L of the core 100. For example, each unit cell 102 of the plurality of unit cells 102 can be modularly formed and integrated into the core block to promote the adjustability of the core design, which represents one aspect of adjustability offered by the design of core 100. This can assist the core 100 in compliance with the output and/or size requirements associated with the intended application. In other non-limiting aspects contemplated by the present disclosure, the unit cells 102 can be integrally formed along at least a portion of the length of the core 100, but similarly configured to achieve the desired output.

Figure 4B:
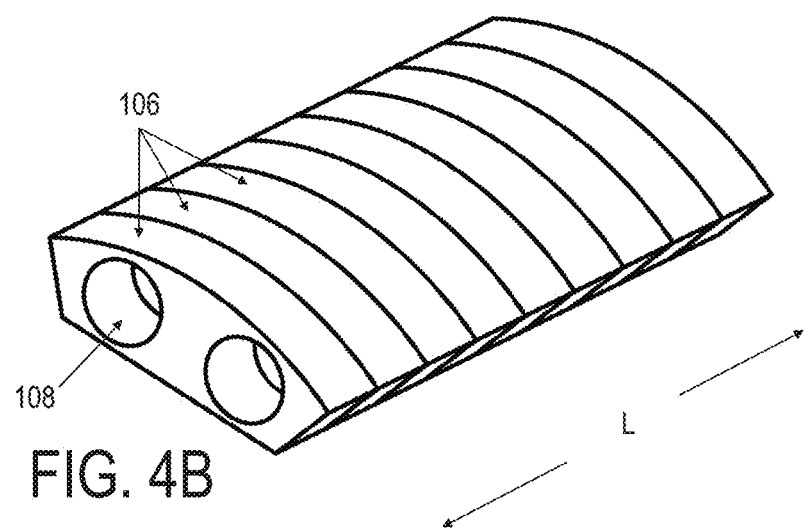
FIG. 4B illustrates a perspective view of a reflector configuration of the core of FIGS. 1 and 2, in accordance with at least one non-limiting aspect of the present disclosure.

Similarly, the reflector 106 configuration depicted in FIG. 4B includes a plurality of reflectors 106 including control drums 108, wherein the reflectors 106 are configured to extend along at least a portion of the length L of the core 100, similar to the configuration previously depicted and discussed in reference to FIG. 1. Of course, according to some non-limiting aspects, the reflectors too can be integrally formed. Again, the reflectors can be specifically configured to create advantageous gaps to promote and enhance heat transfer throughout the core 100.

Figure 4C:
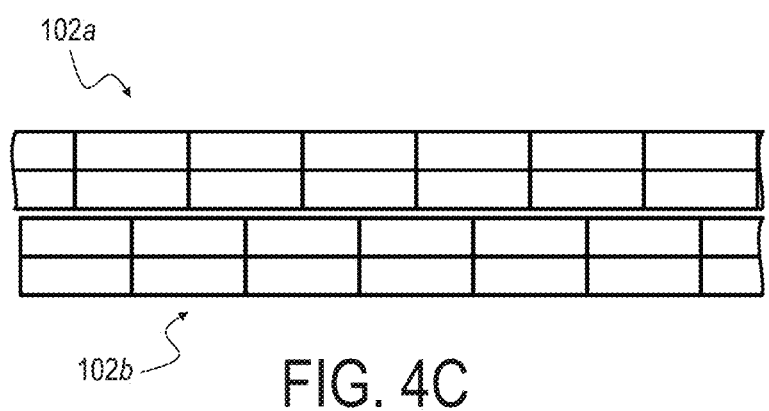
FIG. 4C illustrates a top view of the unit cell of FIG. 3, in accordance with at least one non-limiting aspect of the present disclosure.

Additionally and/or alternatively, according to some non-limiting aspects, it can be advantageous for a row of unit cells 102 to overlap with an adjacent row of unit cells 102. For example, according to the non-limiting aspect of FIG. 4C, a side view of the unit cell of FIG. 3 is depicted in accordance with at least one non-limiting aspect of the present disclosure. As can be seen in FIG. 4C, the unit cells 102 are offset relative to one another. Such overlapping can enhance energy production and/or heat transfer throughout the core 100 and provide the user with one more geometric variable to attenuate to optimize core 100 performance without dramatically altering core 100 design.

Figure 5:
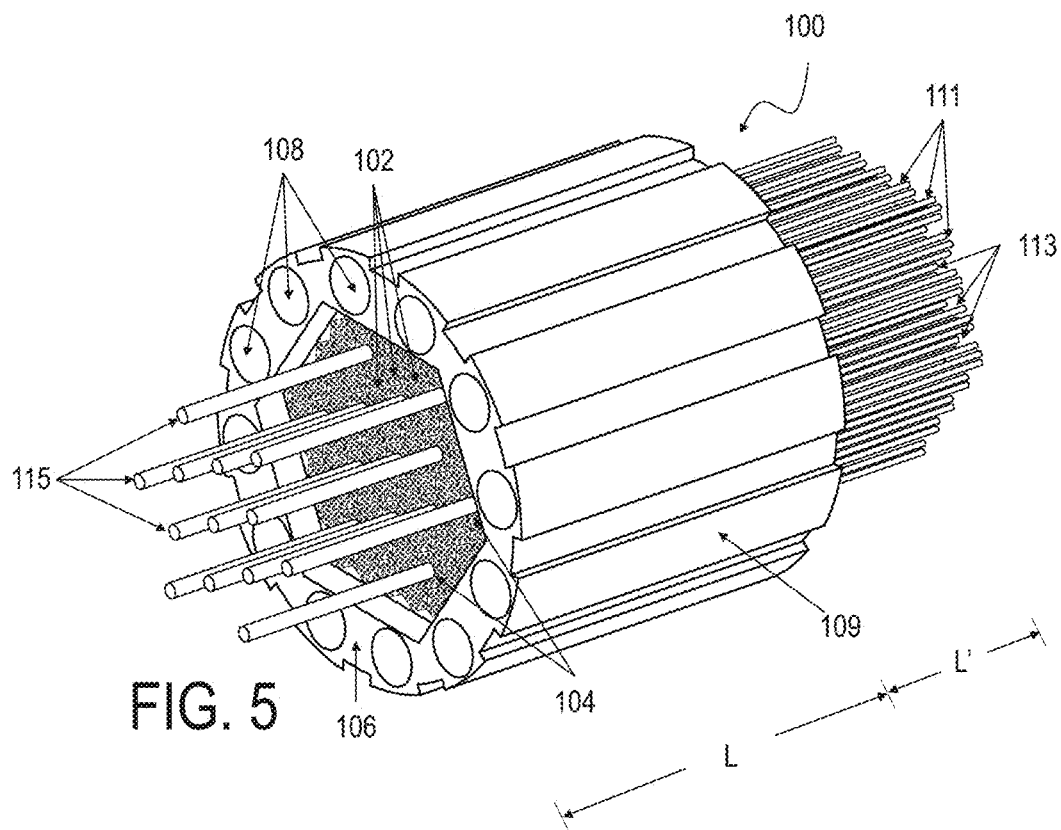
FIG. 5 illustrates a perspective view of the adjustable core of FIGS. 1-4, in accordance with at least one non-limiting aspect of the present disclosure.

Referring now to FIG. 5, a perspective view of the core 100 of FIGS. 1-4 is depicted in accordance with at least one non-limiting aspect of the present disclosure. According to the non-limiting aspect of FIG. 5, the core 100 can be assembled to include a fuel 111 (e.g. rods and/or stacks), heat pipes 113, and reactivity control rods 115 dispositioned throughout the plurality of unit cells 102 and reactivity control cells 104. Specifically, the fuel 111 can be dispositioned throughout the fuel channels 110 (FIG. 3) of one or more unit cells 102, the heat pipes 113 can be dispositioned throughout the heat pipe channels 112 (FIG. 3) of one or more unit cells 102, and the reactivity control rods 115 can be dispositioned through a reactivity control channel (not shown) of one or more reactivity control cells 104. According to some non-limiting aspects, the fuel 111 and heat pipes 113 are configured to extend the predetermined length L of the core 100. In other non-limiting aspects, the fuel 111 and heat pipes 113 are configured to extend an additional length L' beyond the predetermined length L of the core, to facilitate downstream ex-core connections and/or equipment (e.g. power systems, condensers, structural supports). This design allows the core 100 to be customized for any intended application and/or user preference, which enables it to be versatile in response to customer needs. However, these alterations can be evaluated using the underlying nuclear physics and/or manufacturability of the core 100 design, which preserves reliability and predictability in core 100 production and operation. In other words, the assembled core 100 design of FIG. 5 allows the fuel 111 and heat pipes 113 to be specifically configured to accommodate for any specific power requirement and/or structural configuration without having to reinvent the basic core 100 design and assume the inherent development risks.

In further reference to FIG. 5, the reflector 106 can further include a plurality of control drums 108 configured to house a neutron absorptive and reflective materials. In the event of a reactor and/or power failure, the control drums 108 can turn inward towards the core 100 such that the absorptive material to shut down the core 100. According to non-limiting aspect of FIG. 5, the reflector 106 can further include a gamma shield 109 configured to substantially surround a neutron shield, the core 100, and its internal components 102, 104, 111, 113, 115 to further mitigate radiation.

Still referring to FIG. 5, the core 100 can further include a plurality of reactivity control rods 115 configured to be dispositioned through one or more reactivity control cell 104 of the plurality of reactivity control cells 104. For example, the reactivity control cells 104 can include a reactivity control rod or reactivity control channel similar to the fuel channels 110 and/or heat pipe channels 112, but specifically configured to accommodate a reactivity control rod 115. As previously discussed, each reactivity control rod 115 can include a neutron absorbing material configured to slow and/or stop the nuclear reactions within the core 100 in the case of an emergency. The reactivity control rods 115 can collectively work to prevent the core 100 from achieving a critical temperature or prompt criticality in the event of a reactor and/or power failure. Accordingly, the emergence of micro-reactor can increase the prevalence of nuclear technology, making safety a higher priority.

Figure 6:
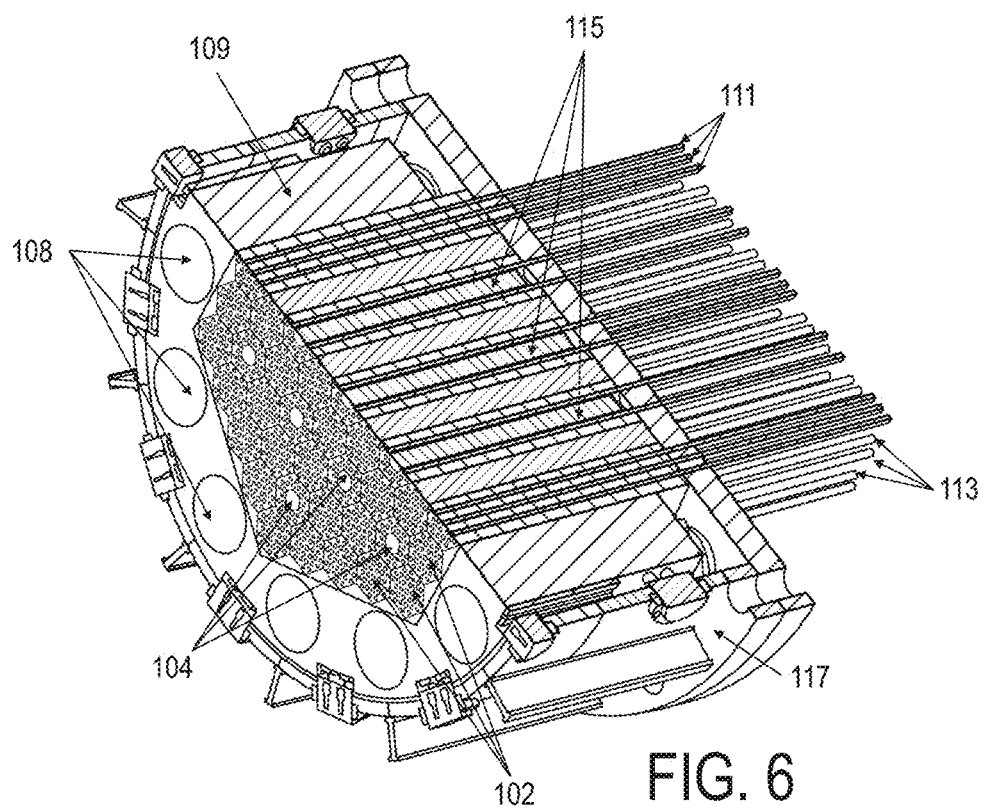
FIG. 6 illustrates a sectioned perspective view of the core of FIGS. 1-5, in accordance with at least one non-limiting aspect of the present disclosure.

Referring now to FIG. 6, a sectioned perspective view of the core 100 of FIGS. 1-5 is depicted in accordance with at least one non-limiting aspect of the present disclosure. According to the non-limiting aspect of FIG. 6, the core 100 including the reflector 106 can be configured to be positioned within an external shroud 117, which can imbue the core 100 with additional structural, shielding, and heat transfer properties depending on the intended application and/or user preference. Notably, FIG. 6 illustrates how the unit cells 102 and reactivity control cells 104 can be arranged relative to one another to form a plurality of fuel channels 110 (FIG. 3), heat pipe channels 112 (FIG. 3), and reactivity control rod and/or reactivity control channels (not shown) that traverse through a block of the core 100. The sectioned view depicts the fuel 111, heat pipes 113, and reactivity control rods 115 dispositioned within the channels 110, 112, thereby forming the functional crux of the core 100. Accordingly, it shall be appreciated that the number of unit cells 102 and/or reactivity control cells 104 can be varied to adjust the output and/or geometrical configuration of the core 100 without significantly altering its design.

It shall be appreciated that, for at least the foregoing reasons, the core 100 design disclosed herein includes an adjustable output with a high manufacturability readiness level. In other words, existing manufacturing techniques can be used to make one unit cell or a cluster of unit cells, the reflector, and/or the overall assembly disclosed herein. Accordingly, the core 100 can be assembled for in-process control of individual core components (e.g. unit-cells, reflector segments) and can include components that are easy to replace and/or modify as needed. These features facilitate the scalability of the core 100 and are especially valuable when compared to conventional, monolithic core configurations.

Figure 7A:
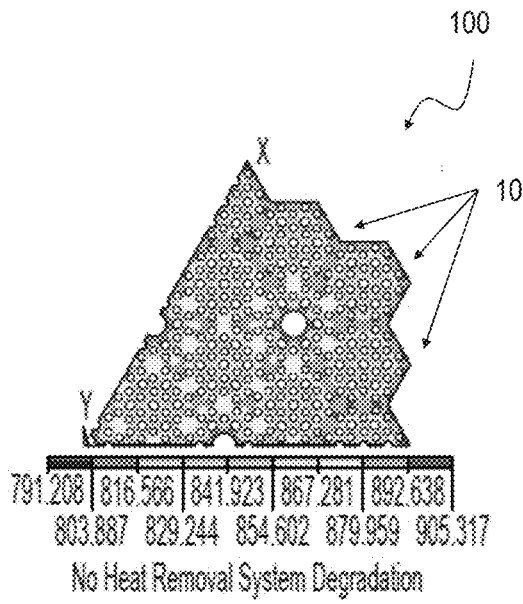
FIGS. 7A and 7B illustrate temperature distributions of at least a portion of the core of FIGS. 1-6, in accordance with at least one non-limiting aspect of the present disclosure.
Figure 7B:
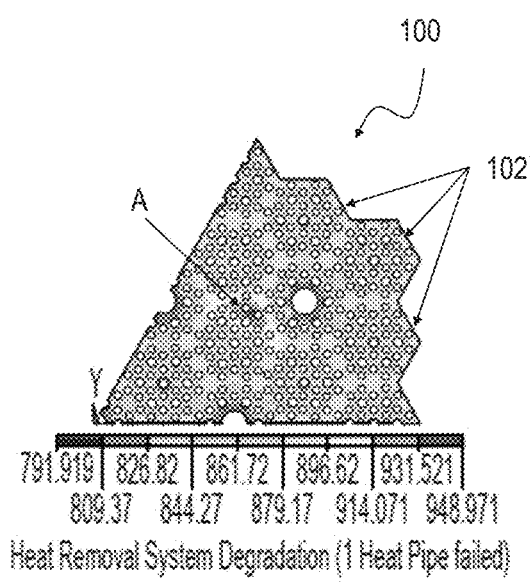

Referring now to FIGS. 7A-9C, several stress distributions of the core 100 of FIGS. 1-6 are depicted in accordance with at least one-aspect of the present disclosure. For example, FIGS. 7A and 7B, FIGS. 7A and 7B illustrate a temperature distributions of at least a portion of the core of FIGS. 1-6. As previously discussed, the unit cells 102 can be arranged such that no greater than a predetermined gap G (FIG. 2) exists between any two adjacent cells 102. The gap G (FIG. 2) enables excess heat to be dissipated by neighboring heat pipes of neighboring unit cells 102 in the event of a heat pipe failure. For example, in FIG. 7A, a typical temperature distribution is depicted without heat removal degradation. However, in FIG. 7B, a heat pipe has failed, as is represented by the temperature concentration at point A. Because the neighboring unit cells 102 are positioned no more than a predetermined gap G from the unit cell 102 with the failed heat pipe, the excess heat can be dissipated by neighboring heat pipes. This is evident in the dissipation of the thermal gradient depicted in FIG. 7B. In other words, the core 100 can be specifically configured such that neighboring unit cells 102 can help to remove heat in case of the heat pipe failure.

Figure 8A:
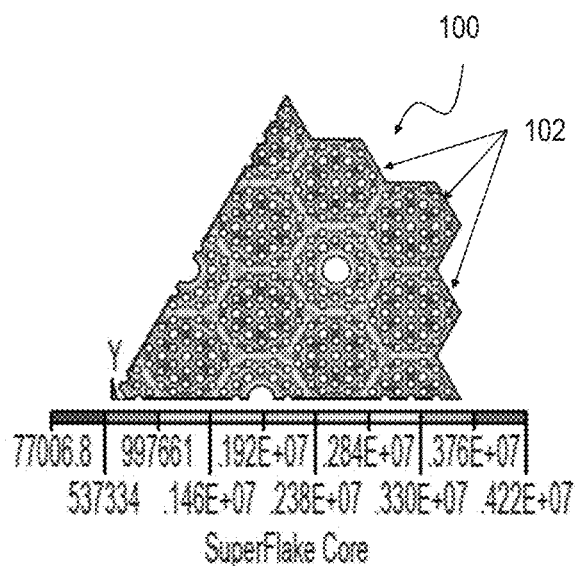
FIGS. 8A and 8B illustrate a comparison of stress distributions in at least a portion of the core of FIGS. 1-6 with stress distributions in a conventional, monolithic core, in accordance with at least one non-limiting aspect of the present disclosure.
Figure 8B:
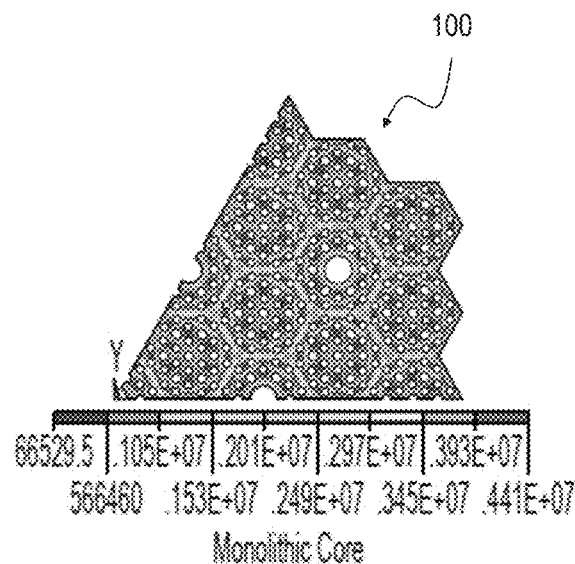
Figure 9A:
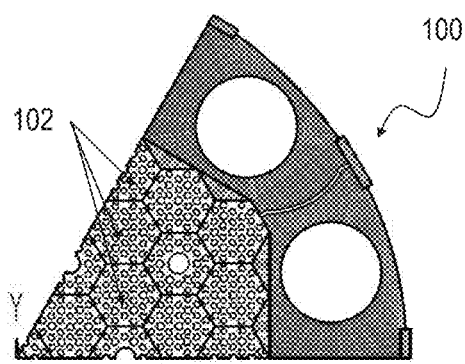
FIGS. 9A through 9C illustrate expected temperature and stress distributions for a maximum expected power level of the core of FIGS. 1-6, in accordance with at least one non-limiting aspect of the present disclosure.
Figure 9B:
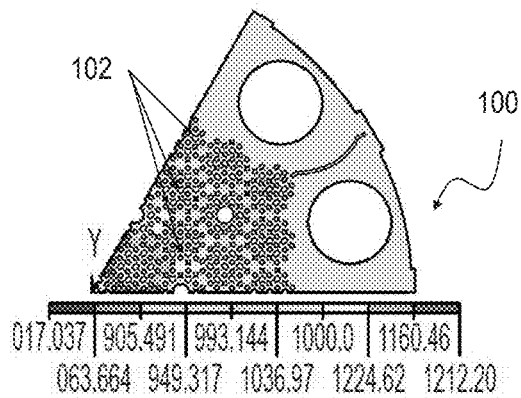
Figure 9C:
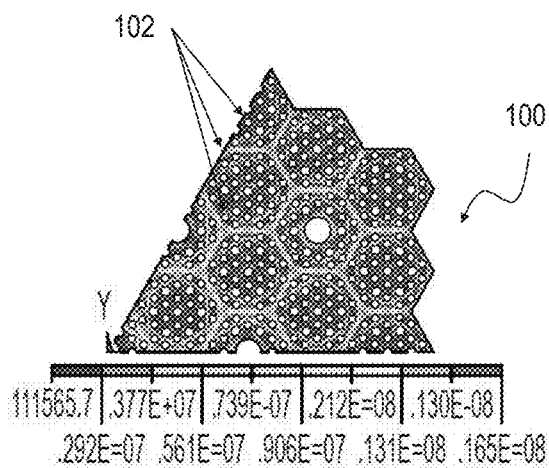

FIGS. 8A and 8B illustrate a comparison of stress distributions in at least a portion of the core of FIGS. 1-6 with stress distributions in a conventional, monolithic core, in accordance with at least one non-limiting aspect of the present disclosure. As is evident from FIGS. 8A and 8B, the equivalent stress in the improved core 100 configuration of FIGS. 1-6 is reduced when compared to stresses in a monolithic core. Although the stress distribution pattern is similar, the magnitude of the stresses experienced is significantly less. FIGS. 9A-C illustrate simulated temperature and stress distributions for a maximum expected power level of the core of FIGS. 1-6, in accordance with at least one non-limiting aspect of the present disclosure. Accordingly, FIGS. 9A-9C illustrate that the overall stresses experienced by the core 100 and its components are below the conventional limits for operating conditions of a nuclear reactor. Accordingly, FIGS. 9A-9C illustrate that, even as the output of the core is adjusted, the core 100 design can facilitate sufficient thermal management capabilities such that the stresses experienced by the core 100 remain in compliance with other customer requirements and/or internal and governmental regulations.

Figure 10:
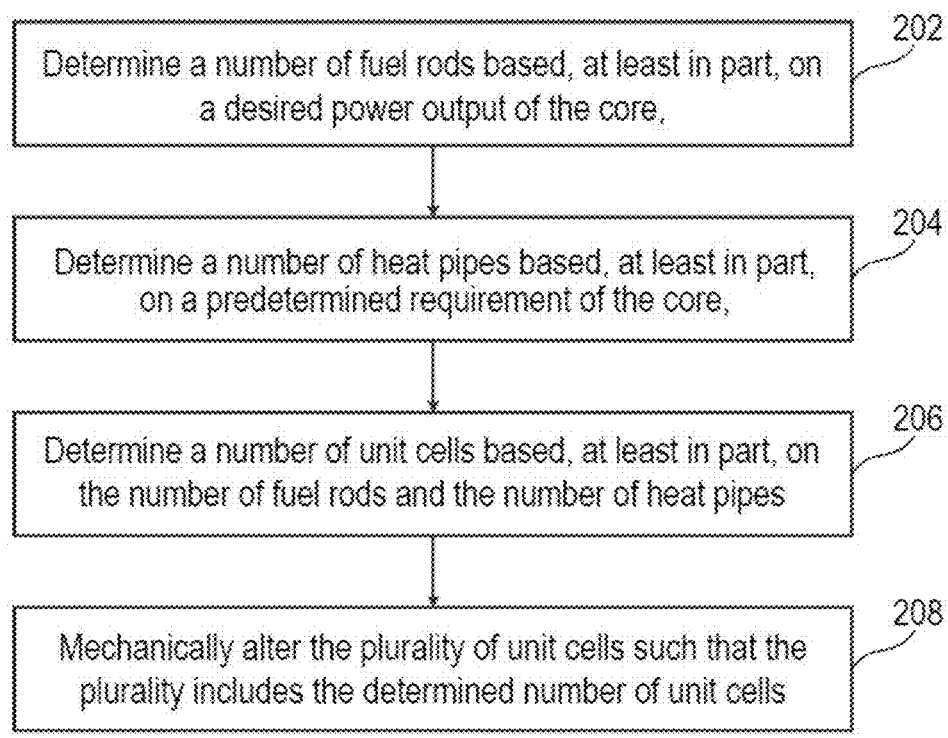
FIG. 10 illustrates a method of adjusting the power output of a core of a nuclear reactor, in accordance with at least one non-limiting aspect of the present disclosure.

Referring now to FIG. 10, a method 200 of adjusting the power output of a core of a nuclear reactor is depicted in accordance with at least one non-limiting aspect of the present disclosure. According to the non-limiting aspect of FIG. 10, the method 200 can include adjusting the power output of a core that includes a plurality of unit cells. Each unit cell of the plurality of unit cells is configured to accommodate fuel configured to generate energy. Furthermore, each unit cell of the plurality of unit cells is configured to accommodate a heat pipe configured to transfer thermal energy away from the core. An initial number of unit cells in the plurality of unit cells corresponds to an initial power output of the core. For example, the initial power output could be a standardized output of the core product line, which takes into account an average output desired by customers of the product line. This can minimize the amount of adjustment required and thus, reduce the amount of development and risk required to adjust the output of the core.

In further reference of FIG. 10, the method 200 can include determining an amount of fuel (e.g. rods and/or stack) based on a desired power output of the core 202. For example, the desired power output of the core can correspond to an intended application of the nuclear reactor. If the nuclear reactor is going to be powering more equipment than the standard, initial product can provide, then the desired power output would be higher than the initial power output. Alternatively, the application could require less power but also afford the core less space or real estate. Accordingly, the output and thus, footprint of the core should be reduced. Next, the method includes determining a number of heat pipes based on a predetermined requirement of the core 204. For example, the nuclear reactor might have to comply with contractual, internal, or governmental thermal requirements or factors of safety. This could affect the amount of heat pipes required to maintain the desired output in compliance with the requirements imposed on the nuclear reactor.

Still referring to FIG. 10, the method 200 further includes determining a number of unit cells based on the determined amount of fuel and the determined number of heat pipes 206. In other words, the method calls for the optimization of power and compliance requirements. This optimization is then integrated into the modular core design. Subsequently, the method includes mechanically altering the plurality of unit cells such that the initial number of unit cells becomes the determined number of unit cells 208. Accordingly, the scalable core is modified to conform with the configuration determined based on the desired power output an compliance requirements.

Various aspects of the subject matter described herein are set out in the following numbered clauses:

Clause 1: An adjustable core for a nuclear reactor configured to be coupled to a reflector configured to accommodate a reflective material, the adjustable core including: a plurality of reactivity control cells, wherein each reactivity control cell of the plurality of reactivity control cells includes a reactivity control rod interface configured to accommodate a reactivity control rod including a neutron absorptive material; and a plurality of unit cells, wherein each unit cell of the plurality of unit cells includes a plurality of fuel channels configured to accommodate fuel, and wherein each cell of the plurality of unit cells includes a plurality of heat pipe channels configured to accommodate a heat pipe configured to transfer thermal energy away from the core; wherein each unit cell of the plurality unit cells is configured to be arranged adjacent to another unit cell of the plurality of unit cells in a radial direction, thereby defining a radial dimension of the adjustable core, wherein the radial dimension corresponds to a predetermined power output of the adjustable core.

Clause 2: The adjustable core according to clause 1, wherein each unit cell of the plurality of unit cells is oriented at a predetermined pitch relative to a radially adjacent unit cell of the plurality of unit cells, and wherein the predetermined pitch corresponds to the predetermined power output of the adjustable core.

Clause 3: The adjustable core according to clauses 1 or 2, wherein the predetermined pitch is greater than or equal to 150 millimeters and less than or equal to 250 millimeters.

Clause 4: The adjustable core according to any of clauses 1-3, wherein each unit cell of the plurality unit cells is configured adjacent to another unit cell of the plurality of unit cells in an axial direction, thereby defining a length of the adjustable core, wherein the length corresponds to a predetermined power output of the adjustable core.

Clause 5: The adjustable core according to any of clauses 1-4, wherein the plurality of unit cells is configured to accommodate additional unit cells in the radial and axial direction, thereby altering the radial and axial dimension of the adjustable core, and wherein altering the radial dimension and length further alters the predetermined power output of the adjustable core.

Clause 6: The adjustable core according to any of clauses 1-5, wherein each unit cell of the plurality of unit cells is configured to be arranged a predetermined distance away from a radially adjacent unit cell of the plurality of unit cells, wherein the predetermined distance is specifically configured such that, if a first heat pipe fails, a second heat pipe radially adjacent to the first heat pipe is configured to compensate for the failure by transferring additional thermal energy away from the core.

Clause 7: The adjustable core according to any of clauses 1-6, wherein the predetermined distance is less than or equal to 2 millimeters.

Clause 8: The adjustable core according to any of clauses 1-7, wherein each heat pipe channel of the plurality of heat pipe channels is substantially surrounded by at least a subset of the plurality of fuel channels.

Clause 9: The adjustable core according to any of clauses 1-8, wherein each unit cell of the plurality of unit cells further includes a moderator channel configured to accommodate a moderator configured to slow neutrons emitted by the fuel.

Clause 10: The adjustable core according to any of clauses 1-9, wherein the plurality of unit cells and the plurality of reactivity control cells are integrally formed.

Clause 11: The adjustable core according to any of clauses 1-10, wherein the fuel channel of each unit cell of the plurality of unit cells includes a first diameter, wherein the heat pipe channel of each unit cell of the plurality of unit cells includes a second diameter, and wherein the first diameter and the second diameter are selected such that heat generated within the plurality of fuel channels of a selected unit cell is removed by the plurality of heat pipes of the selected unit cell.

Clause 12: The adjustable core according to any of clauses 1-11, wherein each unit cell of the plurality of unit cells includes a hexagonal configuration, and wherein each unit cell of the plurality of unit cells is arranged such that the plurality of unit cells collectively include a hexagonal configuration.

Clause 13: An adjustable core assembly for a nuclear reactor, wherein the adjustable core is configured to be coupled to a reflector, the adjustable core assembly including: a plurality of reactivity control cells, wherein each reactivity control cell of the plurality of reactivity control cells is configured to accommodate a reactivity control rod including a neutron absorptive material; and a plurality of unit cells, wherein the plurality of unit cells defines a radial dimension corresponding to an initial power output of the core, wherein each unit cell of the plurality of unit cells is configured to accommodate fuel configured to generate energy, and wherein each unit cell of the plurality of unit cells is configured to accommodate a heat pipe configured to transfer thermal energy away from the core; wherein each unit cell of the plurality unit cells is modularly configured to be coupled to an adjacent unit cell of the plurality of unit cells in a radial direction, thereby altering the radial dimension, wherein the altered radial dimension corresponds to an adjusted power output of the core, and wherein the adjusted power output of the core is different than the initial power output of the core.

Clause 14: The adjustable core assembly according to clause 13, wherein each unit cell of the plurality of unit cells is oriented at a predetermined pitch relative to a radially adjacent unit cell of the plurality of unit cells.

Clause 15: The adjustable core assembly according to clause 13 or 14, wherein each unit cell of the plurality of unit cells is configured to be arranged a predetermined distance away from a radially adjacent unit cell of the plurality of unit cells, wherein the predetermined distance is specifically configured such that, if a first heat pipe fails, a second heat pipe radially adjacent to the first heat pipe is configured to compensate for the failure by transferring additional thermal energy away from the core.

Clause 16: The adjustable core assembly according to any of clauses 13-15, wherein the predetermined distance is less than or equal to 2 millimeters.

Clause 17: A method of adjusting the power output of a core of a nuclear reactor, wherein the core includes a plurality of unit cells, wherein each unit cell of the plurality of unit cells is configured to accommodate a fuel configured to generate energy, wherein each unit cell of the plurality of unit cells is configured to accommodate a heat pipe configured to transfer thermal energy away from the core, wherein an initial number of unit cells in the plurality of unit cells corresponds to an initial power output of the core, the method including: determining an amount of fuel based, at least in part, on a desired power output of the core, wherein the desired power output of the core corresponds to an intended application of the nuclear reactor; determining a number of heat pipes based, at least in part, on a predetermined requirement of the core, wherein the predetermined requirement of the core is based, at least in part, on the intended application of the nuclear reactor; determining a number of unit cells based, at least in part, on the determined amount of fuel to the desired power output and the determined number of heat pipes corresponding to the predetermined requirement; and mechanically altering the plurality of unit cells such that the initial number of unit cells becomes the determined number of unit cells, thereby altering the core such that the initial power output of the core becomes the desired power output of the core.

Clause 18: The method according to clause 17, wherein the core further includes a plurality of reactivity control cells configured to accommodate a reactivity control rod including a neutron absorptive material, and wherein the method further includes: determining a number of reactivity control rods based, at least in part on, the desired power output of the core and a second predetermined requirement of the core, wherein the second predetermined requirement of the core is based, at least in part, on the intended application of the nuclear reactor; determining a number of reactivity control cells based, at least in part, on the determined number of reactivity control rods; and mechanically interspersing the determined number of reactivity control cells throughout the plurality of unit cells.

Clause 19: The method according to clauses 17 or 18, further including: determining a gap between adjacent unit cells of the plurality of unit cells based, at least in part on, a thermal requirement of the core, wherein the thermal requirement of the core corresponds to the intended application of the nuclear reactor; and mechanically altering the plurality of unit cells such that a distance between adjacent unit cells of the plurality of unit cells is less than or equal to the determined gap between adjacent unit cells.

Clause 20: The method according to any of clauses 17-19, wherein mechanically altering the plurality of unit cells further includes mechanically coupling an additional unit cell to an existing unit cell of the plurality of unit cells, thereby increasing the initial number of unit cells.

All patents, patent applications, publications, or other disclosure material mentioned herein, are hereby incorporated by reference in their entirety as if each individual reference was expressly incorporated by reference respectively. All references, and any material, or portion thereof, that are said to be incorporated by reference herein are incorporated herein only to the extent that the incorporated material does not conflict with existing definitions, statements, or other disclosure material set forth in this disclosure. As such, and to the extent necessary, the disclosure as set forth herein supersedes any conflicting material incorporated herein by reference and the disclosure expressly set forth in the present application controls.

The present invention has been described with reference to various exemplary and illustrative aspects. The aspects described herein are understood as providing illustrative features of varying detail of various aspects of the disclosed invention; and therefore, unless otherwise specified, it is to be understood that, to the extent possible, one or more features, elements, components, constituents, ingredients, structures, modules, and/or aspects of the disclosed aspects may be combined, separated, interchanged, and/or rearranged with or relative to one or more other features, elements, components, constituents, ingredients, structures, modules, and/or aspects of the disclosed aspects without departing from the scope of the disclosed invention. Accordingly, it will be recognized by persons having ordinary skill in the art that various substitutions, modifications or combinations of any of the exemplary aspects may be made without departing from the scope of the invention. In addition, persons skilled in the art will recognize, or be able to ascertain using no more than routine experimentation, many equivalents to the various aspects of the invention described herein upon review of this specification. Thus, the invention is not limited by the description of the various aspects, but rather by the claims.

Those skilled in the art will recognize that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

With respect to the appended claims, those skilled in the art will appreciate that recited operations therein may generally be performed in any order. Also, although claim recitations are presented in a sequence(s), it should be understood that the various operations may be performed in other orders than those which are described, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

It is worthy to note that any reference to "one aspect," "an aspect," "an exemplification," "one exemplification," and the like means that a particular feature, structure, or characteristic described in connection with the aspect is included in at least one aspect. Thus, appearances of the phrases "in one aspect," "in an aspect," "in an exemplification," and "in one exemplification" in various places throughout the specification are not necessarily all referring to the same aspect. Furthermore, the particular features, structures or characteristics may be combined in any suitable manner in one or more aspects.

As used herein, the singular form of "a", "an", and "the" include the plural references unless the context clearly dictates otherwise.

Directional phrases used herein, such as, for example and without limitation, top, bottom, left, right, lower, upper, front, back, and variations thereof, shall relate to the orientation of the elements shown in the accompanying drawing and are not limiting upon the claims unless otherwise expressly stated.

The terms "about" or "approximately" as used in the present disclosure, unless otherwise specified, means an acceptable error for a particular value as determined by one of ordinary skill in the art, which depends in part on how the value is measured or determined. In certain aspects, the term "about" or "approximately" means within 1, 2, 3, or 4 standard deviations. In certain aspects, the term "about" or "approximately" means within 50%, 200%, 105%, 100%, 9%, 8%, 7%, 6%, 5%, 4%, 3%, 2%, 1%, 0.5%, or 0.05% of a given value or range.

In this specification, unless otherwise indicated, all numerical parameters are to be understood as being prefaced and modified in all instances by the term "about," in which the numerical parameters possess the inherent variability characteristic of the underlying measurement techniques used to determine the numerical value of the parameter. At the very least, and not as an attempt to limit the application of the doctrine of equivalents to the scope of the claims, each numerical parameter described herein should at least be construed in light of the number of reported significant digits and by applying ordinary rounding techniques.

Any numerical range recited herein includes all sub-ranges subsumed within the recited range. For example, a range of "1 to 100" includes all sub-ranges between (and including) the recited minimum value of 1 and the recited maximum value of 100, that is, having a minimum value equal to or greater than 1 and a maximum value equal to or less than 100. Also, all ranges recited herein are inclusive of the end points of the recited ranges. For example, a range of "1 to 100" includes the end points 1 and 100. Any maximum numerical limitation recited in this specification is intended to include all lower numerical limitations subsumed therein, and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited. All such ranges are inherently described in this specification.

Any patent application, patent, non-patent publication, or other disclosure material referred to in this specification and/or listed in any Application Data Sheet is incorporated by reference herein, to the extent that the incorporated materials is not inconsistent herewith. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein will only be incorporated to the extent that no conflict arises between that incorporated material and the existing disclosure material.

The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system that "comprises," "has," "includes" or "contains" one or more elements possesses those one or more elements, but is not limited to possessing only those one or more elements. Likewise, an element of a system, device, or apparatus that "comprises," "has," "includes" or "contains" one or more features possesses those one or more features, but is not limited to possessing only those one or more features.

What is claimed is:

1. An adjustable core assembly for a nuclear reactor, wherein the adjustable core is configured to be coupled to a reflector, the adjustable core assembly comprising:
    a plurality of control drums configured to shut down the nuclear reactor;
    a plurality of reactivity control cells, wherein each reactivity control cell of the plurality of reactivity control cells is configured to accommodate a reactivity control rod comprising a neutron absorptive material configured to control fission and prevent the adjustable core assembly from achieving a critical temperature without shutting down the nuclear reactor; and
    a plurality of unit cells, wherein the plurality of unit cells defines a radial dimension corresponding to an initial power output of the core, wherein each unit cell of the plurality of unit cells comprises a plurality of fuel channels configured to accommodate fuel configured to generate energy, and wherein each unit cell of the plurality of unit cells comprises a plurality of heat pipe channels configured to accommodate a heat pipe configured to transfer thermal energy away from the core, and wherein a number of fuel channels of the plurality of fuel channels is larger than a number of heat pipe channels of the plurality of heat pipe channels;
    wherein each unit cell of the plurality of unit cells and each reactivity control cell of the plurality of reactivity control cells is modularly configured to be coupled to an adjacent unit cell of the plurality of unit cells and an adjacent reactivity control cell of the plurality of reactivity control cells, thereby altering a radial dimension of the adjustable core assembly, wherein the altered radial dimension corresponds to an adjusted power output of the adjustable core assembly, and wherein the adjusted power output of the adjustable core assembly is different than the initial power output of the adjustable core assembly.

2. The adjustable core assembly of claim 1, wherein each unit cell of the plurality of unit cells is oriented at a predetermined pitch relative to a radially adjacent unit cell of the plurality of unit cells.

3. The adjustable core assembly of claim 1, wherein each unit cell of the plurality of unit cells is configured to be arranged a predetermined distance away from a radially adjacent unit cell of the plurality of unit cells, wherein the predetermined distance is specifically configured such that, if a first heat pipe fails, a second heat pipe radially adjacent to the first heat pipe is configured to compensate for the failure by transferring additional thermal energy away from the core.

4. The adjustable core assembly of claim 3, wherein the predetermined distance is less than or equal to 2 millimeters.

5. The adjustable core assembly of claim 1, wherein each of the plurality of reactivity control cells further comprises a second plurality of fuel channels configured to accommodate fuel configured to generate energy.

* * * * *